United States Patent
Hoffmann

(10) Patent No.: US 7,913,936 B2
(45) Date of Patent: Mar. 29, 2011

(54) DEVICE FOR SOUND ATTENUATION IN A FLOW DUCT

(75) Inventor: Juergen Hoffmann, Untersiggenthal (CH)

(73) Assignee: Alstom Technology Ltd, Baden (CH)

( * ) Notice: Subject to any disclaimer, the term of this patent is extended or adjusted under 35 U.S.C. 154(b) by 917 days.

(21) Appl. No.: 11/269,585

(22) Filed: Nov. 9, 2005

(65) Prior Publication Data

US 2006/0091243 A1 May 4, 2006

Related U.S. Application Data

(63) Continuation of application No. PCT/EP2004/050764, filed on May 12, 2004.

(30) Foreign Application Priority Data

May 15, 2003 (CH) ...................... 0863/03

(51) Int. Cl.
*B05B 1/14* (2006.01)
*A62C 5/02* (2006.01)

(52) U.S. Cl. ............ 239/553; 239/589; 239/8; 239/547; 239/390; 415/1; 415/36; 415/119; 60/39.59; 60/728

(58) Field of Classification Search .............. 239/8, 390, 239/395, 396, 547, 553, 589; 415/30, 36, 415/44, 115, 116, 119, 117, 142, 144, 914, 415/145, 118, 121.5; 60/39.02, 39.05, 39.31, 60/39.092, 39.182, 39.53, 728

See application file for complete search history.

(56) References Cited

U.S. PATENT DOCUMENTS

| | | | | |
|---|---|---|---|---|
| 2,957,308 A | * | 10/1960 | Long et al. ...................... | 138/41 |
| 3,217,488 A | * | 11/1965 | Von Ohain et al. ............. | 60/202 |
| 3,511,337 A | | 5/1970 | Pease et al. | |
| 3,684,054 A | * | 8/1972 | Lemmerman ................. | 181/203 |
| 4,592,208 A | * | 6/1986 | Sollner et al. ................. | 62/323.1 |
| 5,341,991 A | * | 8/1994 | Ericsson ........................... | 239/8 |
| 5,603,471 A | * | 2/1997 | Armstrong ................. | 244/53 R |
| 5,791,138 A | * | 8/1998 | Lillibridge et al. ............. | 60/262 |
| 5,841,079 A | | 11/1998 | Parente | |

(Continued)

FOREIGN PATENT DOCUMENTS

DE       203 097       10/1983

(Continued)

OTHER PUBLICATIONS

Yoshihide, Nakamura, Patent Abstract of Japan No. 2000352320, Dec. 19, 2000, all.*

*Primary Examiner* — Len Tran
*Assistant Examiner* — James S Hogan
(74) *Attorney, Agent, or Firm* — Buchanan Ingersoll & Rooney PC

(57) ABSTRACT

A silencer in a flow duct (10) comprises at least one plate-shaped element (12) which extends essentially parallel to the throughflow direction (16) of the flow duct. Integrated in the plate-shaped element (12), preferably in the downstream region, are means (13, 14) for feeding and for spraying a liquid (15) into the throughflow of the flow duct. The spraying means are preferably arranged in such a way that the liquid (15) is sprayed at an angle of at least 30° to the throughflow (16). The silencer according to the invention is used, for example, in the intake duct of a gas turboset.

16 Claims, 4 Drawing Sheets

U.S. PATENT DOCUMENTS

Figure 1:
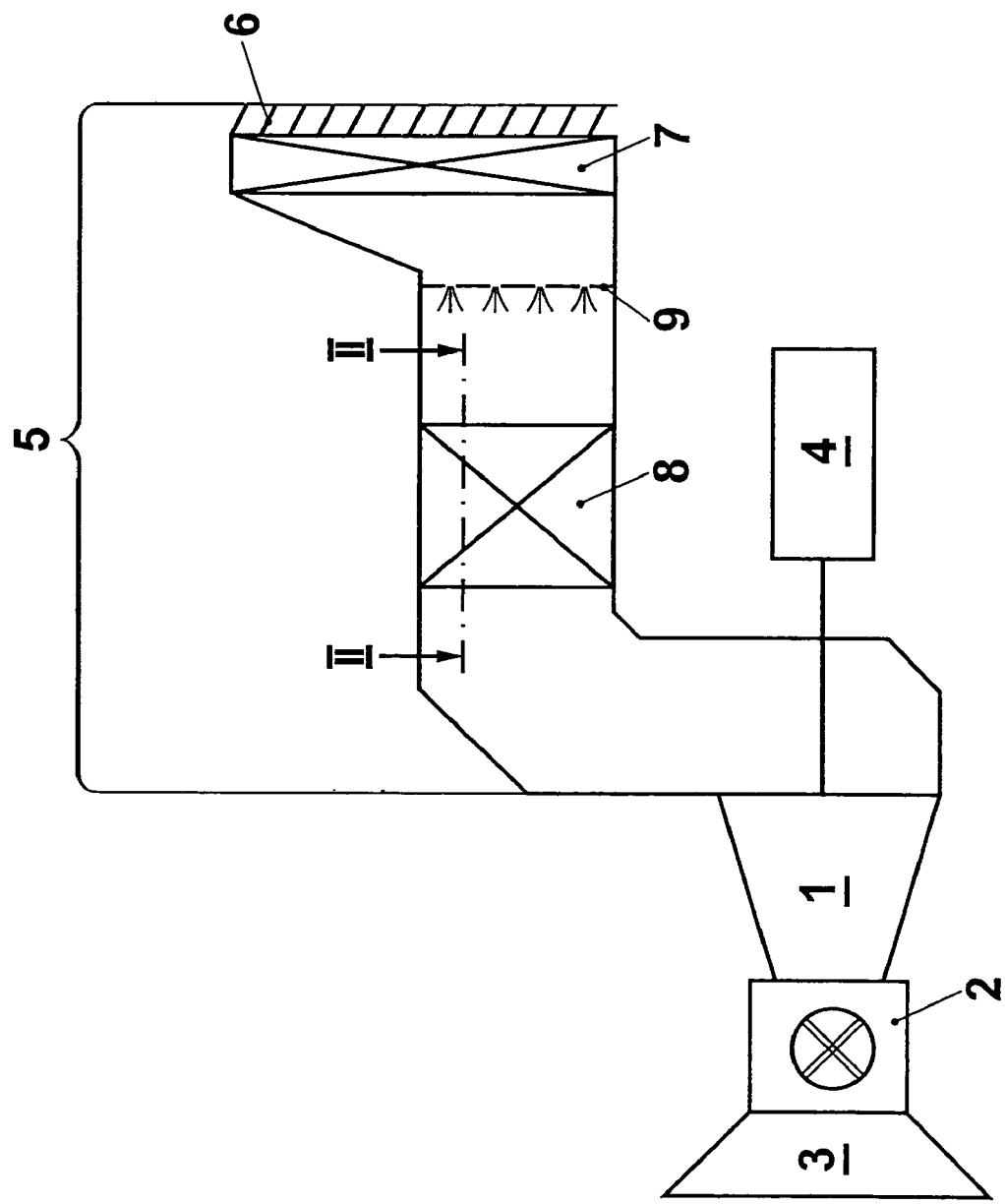
Figure 2:
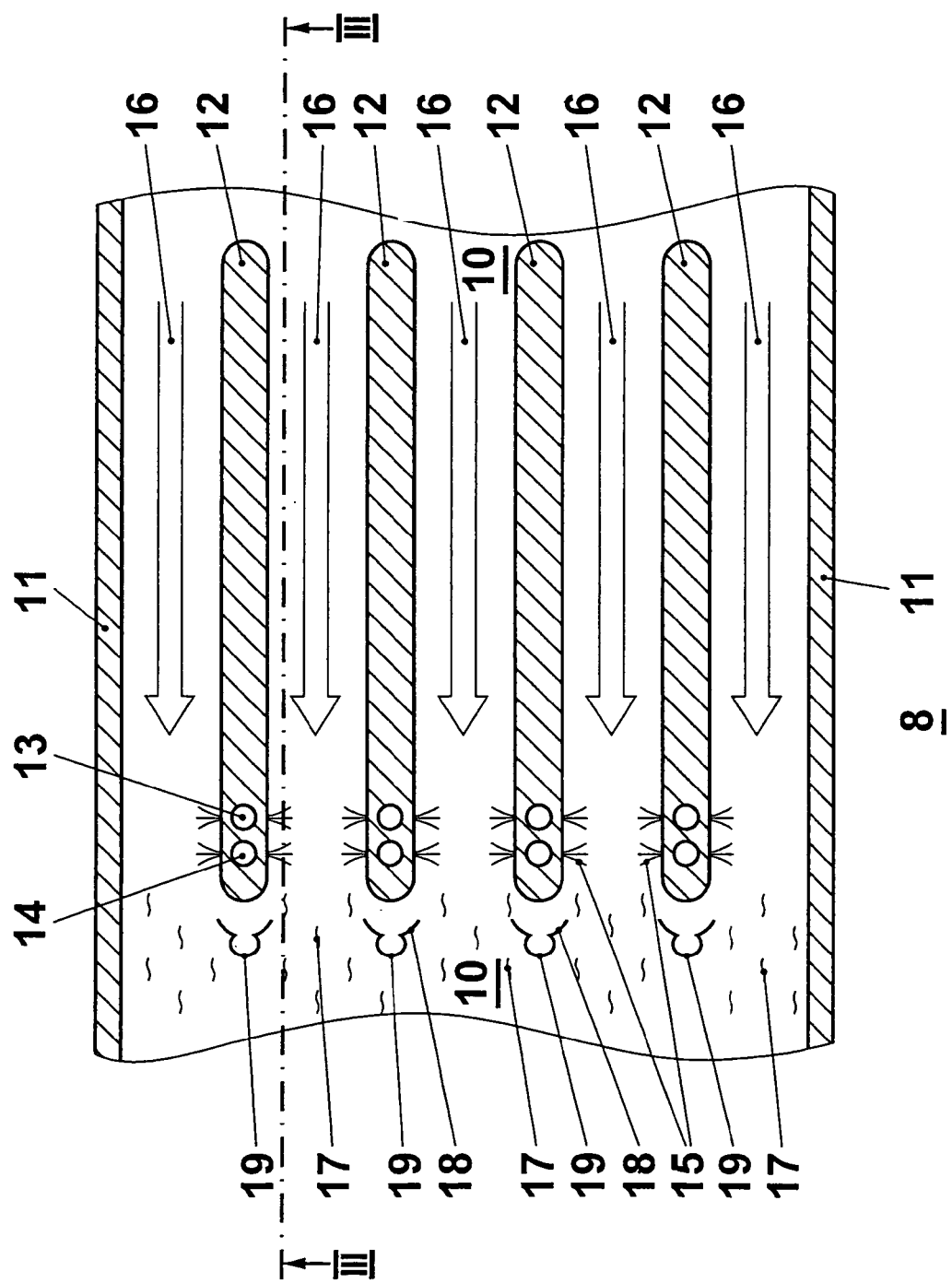
Figure 3:
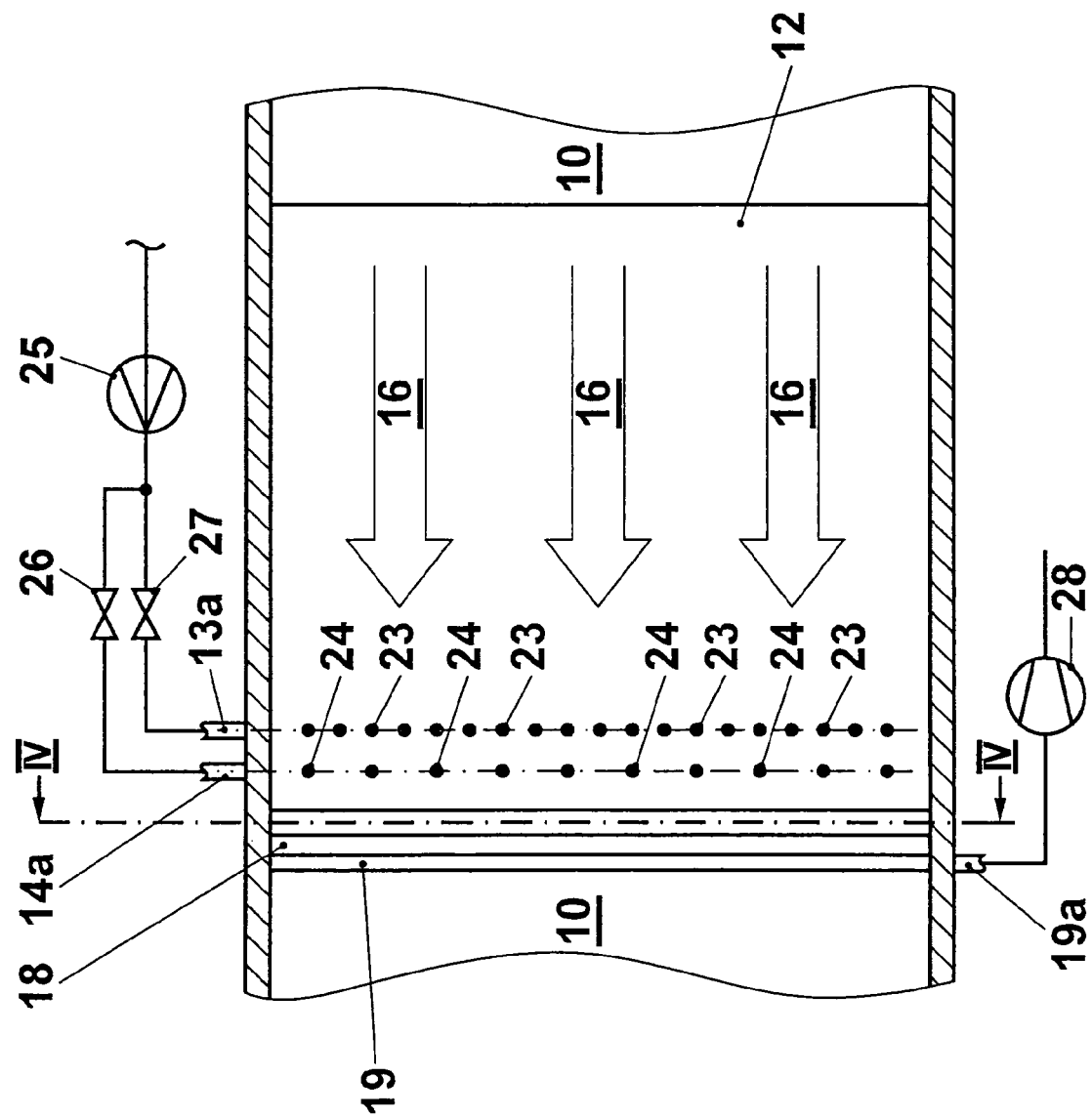

| | | | |
|---|---|---|---|
| 6,027,305 A * | 2/2000 | Ng et al. ...................... 415/119 |
| 6,216,443 B1 | 4/2001 | Utamura | |
| 6,260,658 B1 | 7/2001 | Darrell et al. | |
| 6,267,585 B1 * | 7/2001 | Suttrop ......................... 431/354 |
| 6,354,538 B1 * | 3/2002 | Chilukuri ................. 244/134 B |
| 6,666,016 B2 * | 12/2003 | Papamoschou ............. 60/226.1 |
| 2002/0048511 A1 | 4/2002 | Antoine et al. | |
| 2004/0105755 A1 * | 6/2004 | Bolis et al. .................... 415/116 |

FOREIGN PATENT DOCUMENTS

| | | |
|---|---|---|
| DE | 10254825 A1 * | 6/2004 |
| EP | 0 971 172 A1 | 1/2000 |
| FR | 2.000.275 | 9/1969 |
| JP | 58-057029 | 4/1983 |
| JP | 7-224685 | 8/1995 |
| JP | 2000-352320 | 12/2000 |

\* cited by examiner

DEVICE FOR SOUND ATTENUATION IN A FLOW DUCT

RELATED APPLICATIONS

This application claims priorities under 35 U.S.C. §119 to Swiss Application No. 2003 0863/03, filed May 15, 2003, and as a Continuation Application Under 35 U.S.C. §120 to PCT Application No. PCT/EP2004/050764, filed May 12, 2004, the entire contents of which are hereby incorporated by reference in their entireties.

TECHNICAL FIELD

The present invention relates to a device for sound attenuation in a flow duct according to the preamble of claim 1.

PRIOR ART

U.S. Pat. No. 6,260,658 discloses a silencer in which plate-shaped elements are arranged as sound-attenuation inserts in a throughflow duct, these plate-shaped elements extending essentially parallel to the flow direction. This type of silencer construction is used, for example, in intake ducts of gas turbines. Like all built-in components inside a flow duct, the plate-shaped sound-attenuation elements constitute flow obstacles, which cause pressure losses. Furthermore, on account of the displacement effect of the plate-shaped elements, an at least local maximum flow occurs in the region of the silencer.

In U.S. Pat. No. 6,216,443, it is proposed to inject water into an intake duct of a gas turboset, to be precise in such a way that liquid droplets enter the compressor. The droplets evaporate inside the compressor, during the compression process, a factor which leads to intensive internal cooling of the compressor. As a result, in addition to the mass-flow-increasing effect of the evaporation cooling upstream of the compressor, the power input of the compressor is also reduced, and the final compressor temperature is reduced. In effect, this results in an increase in the achievable maximum of the gas turboset, which of course is primarily limited by the mass flow of working medium and the admissible turbine inlet temperature. U.S. Pat. No. 6,216,443 specifies the injection of water downstream of a silencer in order to avoid precipitation of the sprayed mist on the built-in silencer components. However, it is found that, in the solution proposed there, further flow obstacles have to be inserted into the flow duct in addition to the built-in silencer components.

SUMMARY OF THE INVENTION

The invention is intended to provide a remedy here. The object of the invention characterized in the claims is to specify a device of the type mentioned at the beginning which avoids the disadvantages of the prior art. In particular, the object of the invention is to specify a device of the type mentioned at the beginning which enables a liquid to be introduced into a flow duct without arranging further built-in components in the flow duct, which cause pressure losses. Furthermore, the liquid is to be introduced in a finely atomized manner and in such a way that the fine droplets enter that part of the flow duct which is situated downstream.

The essence of the invention is to integrate a device for water spraying directly in the plate-shaped elements for the sound attenuation. To this end, a plurality of spraying means, for example atomizer nozzles, are arranged in the downstream region, in the region of the downstream edge of at least one plate-shaped element. The arrangement should in any case preferably be made in the downstream third, in particular in the downstream fifth, of the plate. The spraying means are preferably to be arranged in such a way that the average spraying direction has a substantial transverse component relative to the throughflow. The angle of the average spraying direction formed relative to the throughflow is advantageously selected to be greater than 30°, and in particular greater than 45°, preferably greater than 60°, for example 75°, and even above this. Spraying which is effected essentially perpendicularly, that is to say transversely, to the flow, in particular to a gas flow, is especially advantageous. The preferred angles are to be established as follows: due to the markedly different flow vectors of the liquid on the one hand and of the duct throughflow on the other hand, especially high shearing forces act on the boundary surfaces, as a result of which considerable atomization of the liquid introduced occurs. Furthermore, small droplets, which have a high capacity to follow the flow, are deflected and entrained very quickly by the surrounding flow. Large droplets, on the other hand, having a correspondingly large inherent impulse, tend to maintain their direction of movement for a substantially longer period and therefore penetrate into the surrounding flow to a considerable extent. Consequently, the streakiness of the liquid distribution becomes smaller on the one hand. However, a further positive effect is also obtained when a plurality of plate-shaped elements are arranged side by side. This is because droplets of a certain size strike a fixed wall in such a configuration and can be separated there by suitable means. In this way, it can be ensured in the most efficient manner that only small, aerosol-like droplets, for example having diameters of less than 50 µm, pass further downstream into the flow duct.

In an embodiment of the invention, a plurality of plate-shaped elements are arranged essentially parallel to one another in the flow duct, each of the elements extending parallel to the throughflow direction of the flow duct. In this case, a plurality of plate-shaped elements, preferably all the plate-shaped elements, have a spraying arrangement. In another embodiment, several groups of plate-shaped elements arranged in parallel are arranged in the flow duct, the groups being offset from one another in the flow direction. In this case, the spraying devices are preferably arranged in the region of the downstream edges of the plate-shaped elements situated furthest downstream. The spraying device comprises spraying means which are preferably arranged on a line oriented transversely to the throughflow direction. In this case, in one embodiment, the spraying means are distributed uniformly over the entire transverse extent of the plate-shaped element. In a further embodiment, more spraying means are arranged in the center of the plate-shaped element than at the margin, for example the outer 25% of the transverse extent in each case; this has the advantage that the distribution of the sprayed liquid mass flow corresponds more effectively to the distribution of the throughflow of the flow duct. In a further extremely advantageous embodiment, spraying means are arranged on each side of a plate-shaped element.

The invention can be realized in an especially simple manner if the spraying device comprises pressure atomizer nozzles as spraying means.

Furthermore, the spraying device preferably comprises, as liquid-feed means, feed passages which are arranged inside the plate-shaped elements and to which the spraying means are in turn fluidically connected. Especially flexible operation is obtained if at least two liquid-feed means which have spraying means and to which liquid can be admitted independently of one another are arranged in a plate-shaped element.

Furthermore, it is advantageous for flexible operation if liquid can be admitted to the spraying devices of various plate-shaped elements independently of one another.

As mentioned, it is very advantageous in connection with the invention if the spraying device has a pronounced transverse component relative to the throughflow of the flow duct. However, depending on the prevailing conditions, some of the liquid introduced strikes other plate-shaped elements and is deposited there as a liquid film. Potentially undesirably large droplets and liquid streaks are torn free from this liquid film and enter the gas flow. In order to avoid this, liquid-retention devices are advantageously arranged at the downstream edges of the plate-shaped elements. For example, these liquid-retention devices are designed in a simple manner as channels which are open upstream and are arranged downstream of the plate-shaped elements. Furthermore, in one embodiment, these liquid-retention devices contain extraction means via which the separated liquid is drawn off from the flow duct.

Figure 4:
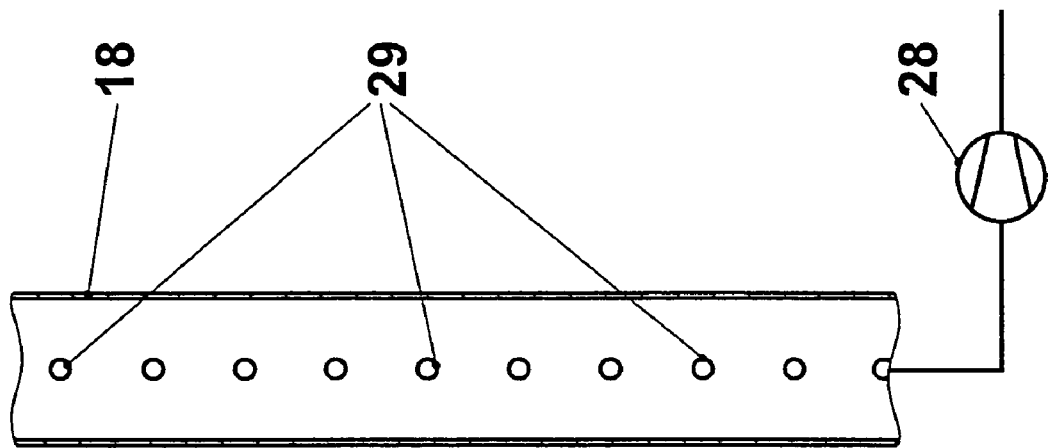

The device according to the invention is especially suitable for use in the inflow ducts of gas turbosets in power generating plants, power stations. It is in this case especially advantageous if the inflow duct is essentially free of built-in components downstream of the sound-attenuation device and upstream of the compressor in such a way that no flow obstacles are arranged on which the finely atomized liquid mist can be deposited as a film or in the form of large droplets. In one embodiment, an air filter is arranged upstream of the sound-attenuation device; furthermore, means for cooling the intake air flow, in particular an evaporation cooler, are arranged upstream of the sound-attenuation device and downstream of the air filter.

Further advantageous embodiments of the invention are revealed in the light of the subclaims and the exemplary embodiments described below.

BRIEF DESCRIPTION OF THE DRAWING

The invention is explained in more detail below with reference to exemplary embodiments illustrated in the drawing, in which, in detail, FIG. 1 shows a gas turboset which has a sound-attenuation device according to the invention in its intake section;

FIG. 2 shows a plan view of the sound-attenuation device according to the invention in the intake duct of the gas turboset from FIG. 1;

FIG. 3 shows a side view of a plate-shaped element used for sound attenuation, in an embodiment according to the invention; and FIG. 4 shows an advantageous detail of a sound-attenuation device according to the invention.

Elements not directly necessary for the understanding of the invention have been omitted. The exemplary embodiments are to be understood purely instructively and are not to be used to restrict the invention characterized in the claims.

WAY OF IMPLEMENTING THE INVENTION

FIG. 1 shows a power station plant, comprising a gas turboset with a compressor 1, a combustion chamber 2 and a turbine 3 and also a generator 4. The compressor 1 draws in air via an inflow duct 5. The latter in turn comprises cover plates 6 at its upstream end which are intended to prevent the ingress of the coarsest dirt and in particular rain or snow during heavy precipitation. Said cover plates 6 are followed by an air filter 7. Arranged further downstream is a sound-attenuation device 8. In a widespread type of construction, said sound-attenuation device 8 consists of a number of plate-shaped elements which are arranged side by side and are oriented parallel to the throughflow direction of the flow duct. This type of construction has been disclosed, for example, by U.S. Pat. No. 6,260,658. Furthermore, arranged in the inflow duct is an injection device 9, via which water or another liquid can be sprayed into the inflow duct. In the process, the water quantity is proportioned in a manner known per se such that all the liquid is evaporated up to the sound-attenuation device 8, as a result of which the intake air is cooled.

Furthermore, it is also known to introduce water quantities into the intake air which oversaturate the latter in such a way that the liquid droplets enter the compressor and lead to internal cooling there during the compression.

FIG. 2 shows a plan view of the intake silencer 8. The flow duct 10 is defined by walls 11. A number of plate-shaped elements 12 are arranged parallel to one another inside the flow duct. The plate-shaped elements 12 are fitted in the flow duct 10 in such a way that they extend parallel to the direction of the throughflow 16, so that the cross section of flow is obstructed as little as possible. In addition, the plate-shaped elements are rounded off aerodynamically at the edges, so that they set up as little resistance as possible to the throughflow. Arranged in the downstream part of each plate-shaped element are liquid-feed passages 13, 14, which run essentially parallel to the downstream edge of an element. Liquid can be advantageously admitted to both passages of each plate-shaped element independently of one another, and said passages can be activated independently of one another. The feed passages are each fluidically connected to a row of spraying means (not shown here) on each side of the plate-shaped element, liquid which is delivered into the passages discharging through said spraying means in the form of spray jets 15 into the flow duct 10. On account of the constriction in the cross section of flow caused by the built-in silencer components 12, the flow velocity increases in the region of the silencer; furthermore, the injection of the liquid is effected with a pronounced transverse component relative to the throughflow 16. As a result, the air flow 16 produces pronounced subsequent atomization of the injected liquid jets and entrains a finely atomized liquid mist 17. At the same time, it is possible for wall films to form on the plate-shaped elements and for large secondary droplets and liquid streaks to be entrained from there. In order to avoid a situation in which these secondary droplets and liquid streaks can penetrate into the downstream flow in an undesirable manner, liquid-retention devices 18 are arranged downstream of the downstream edges of the plate-shaped elements, which liquid-retention devices 18 in the present case have the shape of channels open upstream and in which such liquid fragments entrained from a wall film collect. In addition, said liquid-retention devices 18 have an extraction device 19, for example in the form of a perforated tube, which, in a manner which is not shown but is familiar to the person skilled in the art, is connected to a suction apparatus, as a result of which collected liquid is removed and if need be processed again and injected again.

FIG. 3 shows a side view of a plate-shaped element 12 installed in the intake duct 10. Two rows of atomizer nozzles 23, 24 arranged as spraying means are shown in that region of the element 12 which is situated downstream. The spraying means are supplied with liquid via the liquid feeds 13 and 14 (not shown here) arranged in the interior of the plate-shaped element. The liquid feeds 13 and 14, which cannot be seen here, run inside the plate-shaped element from top to bottom; that is to say they extend essentially transversely to the main flow direction of the duct flow 16 over essentially the entire transverse extent of the plate-shaped element. In this case, in a manner which is not shown but is familiar per se, the first liquid feed 13 is fluidically connected to the first atomizer nozzles 23 and the liquid feed 14 is fluidically connected to the second atomizer nozzles 24. The feed lines 13*a* and 14*a* are indicated in the figure. Liquid is fed via a pump 25, and its inflow to the group of first nozzles 23 and the group of second nozzles 24 is controlled via the shutoff and/or regulating members 26 and 27. It can clearly be seen that more first nozzles 23 are arranged than second nozzles 24. If the nozzles are largely identical, this means that, at the same liquid supply pressure, the liquid mass flow through the first nozzles, in proportion to the number of nozzles, is greater than the liquid mass flow through the second nozzles. In an especially advantageous manner, the design mass flows of the two nozzle groups is graduated as 1:2; a mass flow graduation in the ratio of 0:1:2:3 can then be realized in a very simple manner at the same liquid supply pressure by operating shutoff members 26, 27. The nozzles in the present case are distributed approximately uniformly over the transverse extent of the plate-shaped element 12; in another embodiment, more nozzles are arranged in the center than at the margin. A retention device 18, in the form of a U profile, with an extraction device 19, is also arranged downstream of the downstream edge of the plate-shaped element. The extraction device 19 is led out of the flow duct 10 by means of a connection piece 19*a* and is connected to a suction fan 28 or another suitable suction apparatus. This is again shown in FIG. 4 in a direction of view in the flow direction. The collecting device consists of a U-shaped channel 18 which is open upstream and has openings 29 at its base, which produce a connection to the extraction device 19. Flow streaks which are possibly released from the plate-shaped element 12 are collected in the channel 18 and are drawn off by the suction fan 28 through the openings 29 and the tube 19.

In the light of the statements made above, embodiments of the invention characterized in the claims which go beyond the exemplary embodiments present themselves to the person skilled in the art.

LIST OF DESIGNATIONS

1 Compressor
2 Combustion chamber
3 Turbine
4 Generator
5 Inflow duct; intake section
6 Cover plates
7 Air filter
8 Sound-attenuation device, intake silencer
9 Injection device
10 Flow duct
11 Duct wall
12 Plate-shaped element, sound-attenuation element
13 Liquid-feed passage
13*a* Feed line
14 Liquid-feed passage
14*a* Feed line
15 Spray jet
16 Throughflow, gas flow
17 Liquid mist
18 Liquid-retention device, collecting channel
19 Extraction line
19*a* Extraction line; connection piece
23 First spraying means; atomizer nozzles
24 Second spraying means; atomizer nozzles
25 Pump
26 Shutoff and/or regulating member
27 Shutoff and/or regulating member
28 Suction fan
29 Openings

What is claimed is:

1. A device for sound attenuation in a flow duct, comprising at least one plate-shaped element which is arranged inside the flow duct and which extends essentially parallel to the throughflow direction of the flow duct, wherein a device for spraying a liquid is integrated in the at least one plate-shaped element, and the spraying device comprises a plurality of spraying means arranged on a line oriented essentially transversely to the throughflow direction on both sides of the at least one plate-shaped element, wherein the spraying means are arranged in such a way that a main direction of injection of a liquid encloses an angle of at least 45° with the throughflow; and wherein liquid-retention devices are arranged downstream of downstream edges of the at least one plate-shaped elements.

2. The device as claimed in claim 1, wherein a plurality of plate-shaped elements are arranged parallel to one another in the flow duct.

3. The device as claimed in claim 2, wherein the plurality of plate-shaped elements have an upstream end and a downstream end, wherein the spraying device is arranged in a downstream third, in particular in a downstream fifth, of the plurality of plate-shaped elements.

4. The device as claimed in claim 2, wherein several of the plate-shaped elements, preferably all the plate-shaped elements, have a device for spraying a liquid.

5. The device as claimed in claim 4, wherein the plate-shaped elements have an upstream end and a downstream end, wherein the spraying device is arranged in a downstream third, in particular in a downstream fifth, of the plate-shaped elements.

6. The device as claimed in claim 1, wherein the at least one plate-shaped element has an upstream end and a downstream end, wherein the spraying device is arranged in a downstream third, in particular in a downstream fifth, of the at least one plate-shaped element.

7. The device as claimed in claim 1, wherein the spraying device comprises pressure atomizer nozzles.

8. A power generating plant, comprising a gas turboset, having an inflow duct arranged upstream of the compressor of the gas turboset and comprising a sound-attenuation device as claimed in claim 1.

9. The power generating plant as claimed in claim 8, wherein the inflow duct is free of built-in components between the sound-attenuation device and the compressor.

10. The power generating plant as claimed in claim 8, wherein an air filter is arranged upstream of the sound-attenuation device.

11. The power generating plant as claimed in claim 8, wherein means for cooling the intake air flow, in particular an evaporation cooler, are arranged upstream of the sound-attenuation device and downstream of the air filter.

12. The power generating plant as claimed in claim 8, wherein means for cooling the intake air flow, in particular an evaporation cooler, are arranged upstream of the sound-attenuation device and upstream of the air filter.

13. The device as claimed in claim 1, wherein the liquid-retention devices have an extraction device, which is connected to a suction apparatus which removes collected liquid.

14. A device for sound attenuation in a flow duct, comprising at least one plate-shaped element which is arranged inside the flow duct and which extends essentially parallel to the throughflow direction of the flow duct, wherein a device for spraying a liquid is integrated in the at least one plate-shaped element, and the spraying device comprises a plurality of liquid-spraying means which are fluidically connected to at least two liquid-feed means, to which liquid can be admitted independently of one another, the liquid spraying means and the liquid-feed means being arranged in the at least one plate-shaped element.

15. A device for sound attenuation in a flow duct, comprising at least one plate-shaped element which is arranged inside the flow duct and which extends essentially parallel to the throughflow direction of the flow duct, wherein a device for spraying a liquid is integrated in the at least one plate-shaped element, and a liquid-retention device is arranged in operative connection with a downstream edge of the at least one plate-shaped element.

16. The device as claimed in claim 15, wherein the retention device comprises extraction means.

* * * * *